United States Patent

[11] 3,545,614

| [72] | Inventor | Charles E. Sheetz |
| | | Woodstock, Virginia |
| [21] | Appl. No. | 803,228 |
| [22] | Filed | Feb. 28, 1969 |
| [45] | Patented | Dec. 8, 1970 |
| [73] | Assignee | FMC Corporation |
| | | San Jose, California |
| | | a corporation of Delaware |

[54] WEIGHT GRADING MACHINE
8 Claims, 6 Drawing Figs.

| [52] | U.S. Cl. | 209/121 |
| [51] | Int. Cl. | B07b 13/08 |
| [50] | Field of Search | 209/121; 177/262 |

[56] References Cited
UNITED STATES PATENTS

| 1,169,467 | 1/1916 | Cutler | 209/121 |
| 1,728,463 | 9/1929 | Wyland | 209/121 |
| 2,490,945 | 12/1949 | Carruthers | 209/121 |
| 2,980,252 | 4/1961 | Bray et al. | 209/121 |

*Primary Examiner*—Allen N. Knowles
*Attorneys*—F. W. Anderson and C. E. Tripp

ABSTRACT: An improved article holding tray for a weight grading machine of the type which conveys the trays over fixed scale units, each of which is arranged to weigh and dump articles of a given weight range. The trays are mounted on parallelogram linkage and on a torsionally rigid support member so that the position of an article in the tray, or the weight distribution or symmetry of the article do not affect accurate weight measurement.

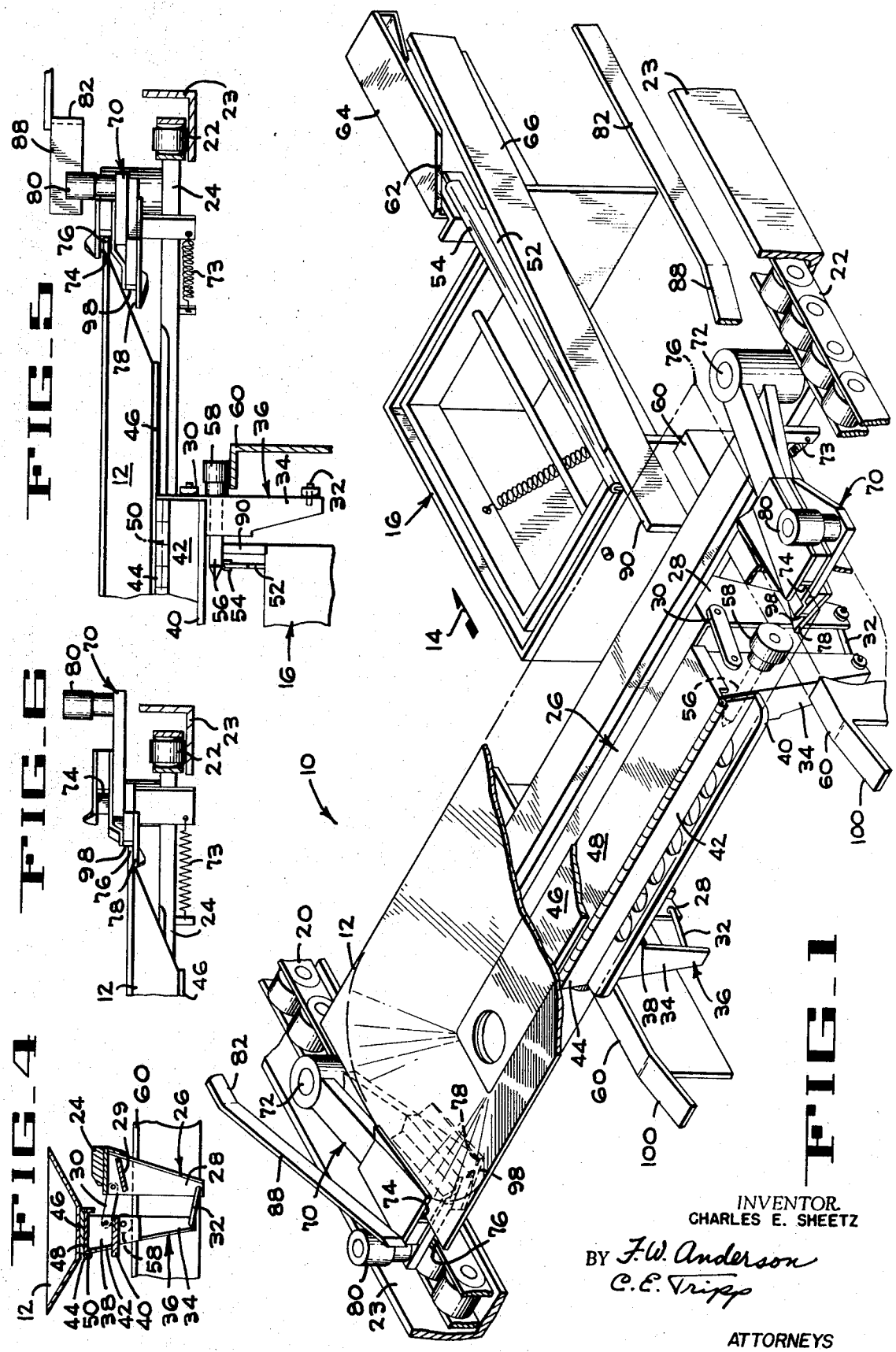

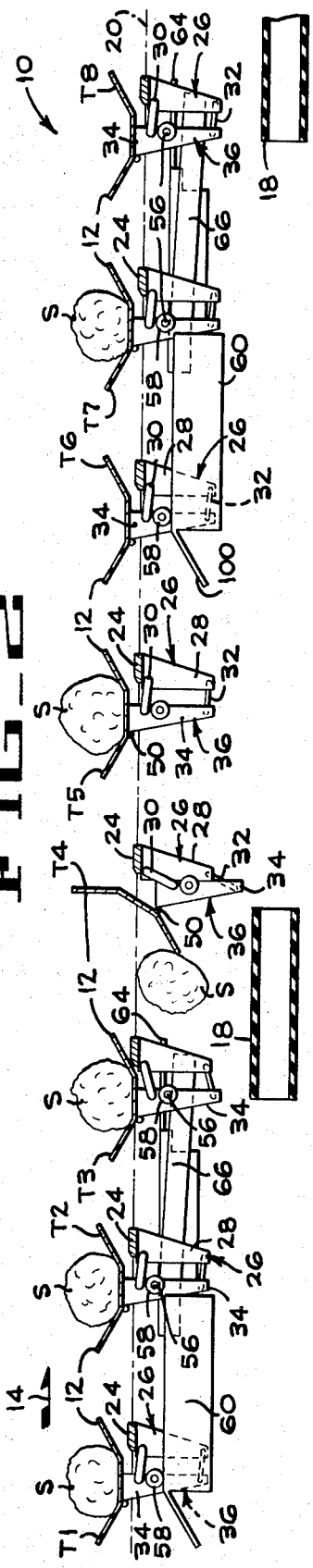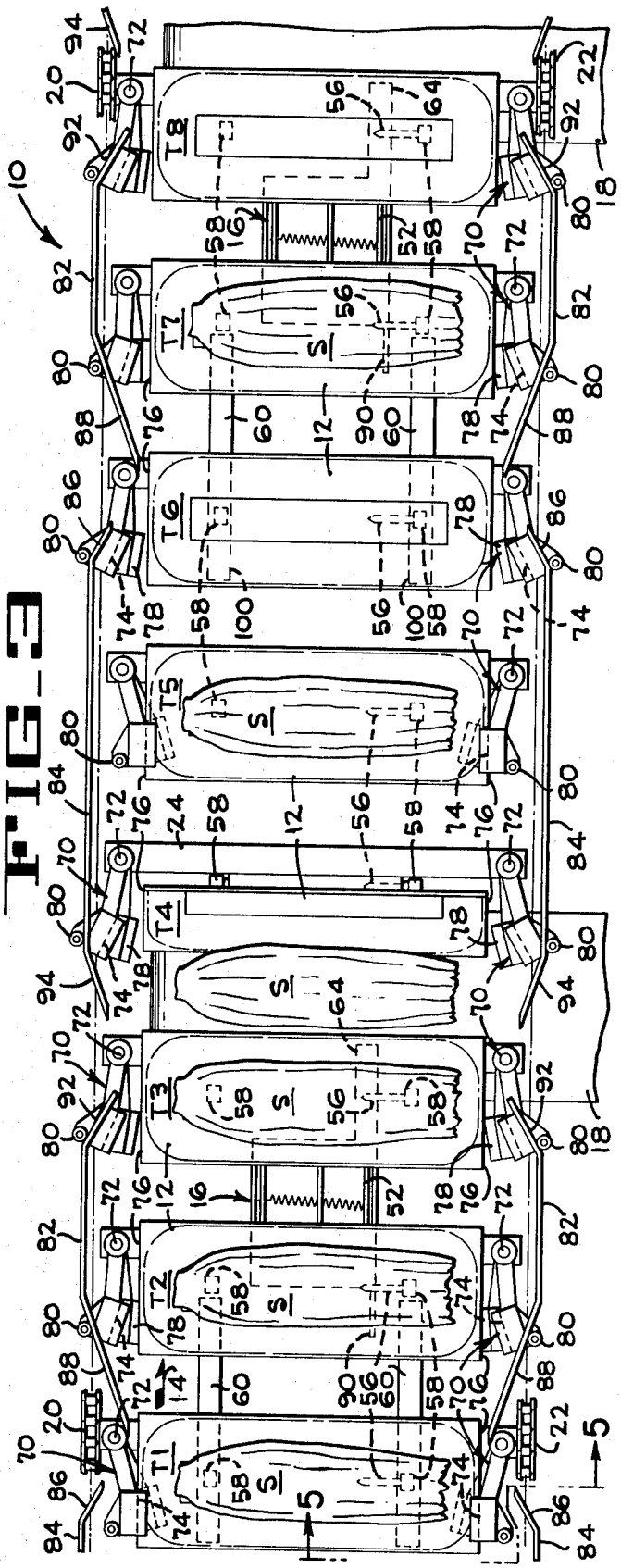

WEIGHT GRADING MACHINE

BACKGROUND OF THE INVENTION

The field of the present invention is in continuous weight grading machines which grade articles into different weight groups. In some prior art weight grading machines, such as those disclosed in U.S. Pat. Nos. 3,092,196 and 2,980,252, fruit or vegetable articles are carried in cuplike trays which center the article in the tray. The tray is pivotally mounted at a fixed point from the center of the tray, and is carried by conveying means over a plurality of scale platforms. If one scale platform is preset to be depressed by an article heavier than the article in the tray, the tray continues on to traverse another scale platform. If the scale platform is depressed by the article, the tray drops about its pivot and automatically dumps the article. It is important to note that in this type of tray assembly, the mass of the article must be at a fixed distance from the pivot axis of the tray to obtain accurate weight measurement; this type of arrangement is thus suitable for generally round fruit, such as apples, in conjunction with a cup shaped tray so that the fruit is automatically centered in the cup by gravity in proper position for accurate weighing.

The problem of weighing produce which is not symmetrical, has unequal weight distribution, or which varies in size cannot be satisfactorily handled by using a larger tray with the apparatus above described because unequal load distribution across the direction of conveying movement inhibits pivotal movement of the tray in the weighing operation, and varying load distribution in the other direction adversely affects the accuracy of the weighing operation. It has been found that the actual weight variance with one weight grading machine modified as indicated above is plus or minus 1½ ounces for a 2½ pound celery stalk, a degree of inaccuracy which is commercially unacceptable, and which is greatly improved by the weight grading machine of the present invention.

SUMMARY OF THE INVENTION

The concept embodied in the present invention is the provision of a rigid mounting bar extending between the conveyor chains for moving each tray, an elongate tray parallel to the mounting bar and supported by a torsionally rigid support member, and parallelogram linkage interconnecting each end of the support member and the mounting bar for confining movement of the tray to a substantially vertical plane. Thus mounted, the weight localized on a single scale pin carried by the support member and arranged to slide over the scale platforms is substantially the same wherever the article to be weighed is located in the tray. This feature provides for accurate weight measurement of symmetrical or asymmetrical articles, particularly articles having nonuniform weight distribution, such as celery stalks.

BRIEF DESCRIPTION OF THE DRAWINGS

FIG. 1 is an enlarged fragmentary perspective of part of a weight grading machine in accordance with the present invention, showing one of the weighing units of the machine.

FIG. 2 is a diagrammatic fragmentary section illustrating part of the conveying flight of a weight grading machine incorporating the present weighing units and illustrating the sequence of operations performed by the weighing units.

FIG. 3 is a diagrammatic plan of the conveying flight shown in FIG. 2.

FIG. 4 is a diagrammatic section through the article support tray shown in FIG. 1.

FIG. 5 is an enlarged vertical section taken along lines 5–5 on FIG. 3.

FIG. 6 is a section similar to FIG. 5, but with the parts in a different operational position.

DESCRIPTION OF THE PREFERRED EMBODIMENT

FIG. 2 illustrates a portion of the upper flight of a weight grading machine 10 which is especially adapted to grade celery stalks S. In a manner similar to the manner known from the above identified patents, individual stalks are carried in supporting cups or trays 12 in the direction of the arrow 14 over a plurality of scale units 16, each of which measures a different weight range. When one of the scales has its weighing platform depressed by the weight of a stalk, the tray is automatically dumped and the stalk is deposited upon a discharge belt conveyor 18 to be accumulated or packed at some other point with other stalks in a similar weight range. The present invention provides support tray assemblies which are unaffected by the weight distribution of the stalks (or other articles) in the trays, and provides unique tray manipulating means for supporting the trays between scales and dumping the stalks at the discharge stations adjacent the scales.

With detailed reference to FIGS. 1 and 3 of the drawings, the weight grading machine 10 is provided with continuously driven, laterally spaced endless chains 20 and 22 which are supported by tracks 23 and are interconnected by a plurality of equally spaced transverse tray mounting bars 24. Each mounting bar 24 carries one of the trays 12 and its associated supporting mechanism. For this purpose, a mounting bracket 26 of inverted U-shape is secured to the underside of each mounting bar 24. A leg 28, L-shaped in cross section, depends from each end of the mounting bar, and the two legs are interconnected by a brace bar 29. Thus constructed, the bracket 26 is a rigid unit especially adapted to resist dynamic misalinement of the legs 28. Each depending leg 28 of the bracket 26 has a pivotal connection to an upper link 30 and a lower link 32. The respective pivot points are vertically aligned and the links 30 and 32 cooperatively provide a parallelogram connection to the structure associated with the tray 12.

Thus, the two links are of equal length, and are pivotally connected to the depending leg 34 of a tray support member 36 which is also of inverted U-shape. Similarly, the other depending leg 34 of the tray support member 36 is connected by upper and lower parallelogram links 30 and 32 to the other depending leg 28 of the bracket 26. Each leg 34 is L-shaped in cross section and is reinforced by an inner plate portion 38 (FIG. 4). latter plates are welded to a relatively rigid transverse beam 40, and the legs 34 are connected to the upstanding leaf 42 of a hinge 44 which is coextensive with the beam 40. Thus constructed, the tray support member 36 is torsionally rigid so that up and down movement of one end of the tray support member assures that the other end of the support member moves a similar amount. Such movement, of course, is limited to a substantially vertical plane due to the parallelogram linkage connecting the tray support member 36 to the mounting bar 24.

The tray 12 is mounted upon a rigid bar 46 that is in turn secured to the other leaf 48 of the hinge 44. So mounted, the tray 12 is pivotable between a substantially level position in which its leading undersurface overlies the mounting bar 24, toward a rearwardly tilted dumping position about the pivot axis 50 of the hinge.

The tray support member 36 and the mounting bracket 26 are of inverted U-shape to provide clearance for each of the scales 16 in the path of tray movement. The details of the scales are not critical to the present invention, but their general operation is that each scale can be preset to bias, with predetermined upward force, a vertically depressible horizontal scale beam or blade 52 having a coextensive Nylon wear strip 54 on its upper edge.

As best shown in FIGS. 1 and 5, one of the depending legs 34 of the tray support member 36 is provided with an inwardly projecting hardened scale pin 56 having a conical end, and the other end of the scale pin carries a roller 58. A similar roller 58 (FIG. 4) is mounted on the other leg 34. The two alined rollers are arranged to be briefly supported by track segments 60 which precede each scale unit 16.

In the manner known from the aforementioned U.S. Pat. No. 3,092,196, the scale pins 56 (FIG. 2) are arranged to slide over the scale beams 52 after the rollers 58 move off the track segments 60 and leave the tray unsupported. With a stalk in the tray 12, and the scale pin 56 resting upon the scale beam 52, the scale beam will be depressed a distance governed by the weight of the stalk. If the spring bias of the scale beam prevents the conical end of the scale pin 56 from traveling under a diagonal knife edge 62 (FIG. 1) of a short track 64, the scale pin slides over the track 64 and the tray progresses to the next scale unit.

On the other hand, if the stalk weight is such that the scale beam is depressed to position the scale pin 56 under the edge 62, the scale pin moves over a declining support track 66 for dumping of the article onto the adjacent discharge conveyor 18. The dumping action occurs after the scale pin 56 leaves the track 66 (FIG. 2), and is the result of the tray support member 36 being free to drop. In dropping, the portion of the tray 12 which overlies the mounting bar 24 strikes the mounting bar and tilts the tray rearward about the axis of the hinge 44. The tray is thus overbalanced rearward and the stalk is dumped. After the stalk is discharged, gravity overbalances the tray to its former position when the tray support member is elevated to its former position.

It is to be noted that the tray 12 extends laterally beyond the support track 66. Accordingly, the track 66 cannot maintain support of the tray until the dumping action occurs, because the celery stalk would strike the track. This support function is effected by memory arm clamps 70, one of which is mounted on each end portion of the mounting bar 24. One function of the memory arm clamps is to cooperatively support the ends of the tray when the tray travels beyond a scale unit 16, either for dumping on the nearest discharge conveyor 18, or for movement onto the next scale unit. Also, the memory arm clamps engage a tray rearward of the pivot axis of its mounting hinges and prevent the tray from tilting rearward about said axis.

With reference to FIGS. 3, 5 and 6, each memory arm clamp 70 is pivotally mounted on an upstanding pivot pin 72 that is secured to the mounting bar 24. A tension spring 73 (FIG. 5) interconnects a tab on each clamp arm with a tab on the mounting bar 24 and biases the memory arm clamp inwardly. The memory arm clamp arm is a rigid, fabricated assembly defining an inwardly open channel at 74 (FIG. 5) which is adapted to straddle the outer end portion 76 of the tray 12, and defining a ledge 78 (FIG. 6) which is below and inward of the channel 74. The ledge 78 is adapted to support the outer end portion 76 of the tray 12.

When the tray is gripped by the channels 74, the elevation of the tray is such that the scale pin 56 will slide onto the scale beam 52. In other words, the tray is at the same elevation it has when the rollers 58 are supported by the track segments 60. When the tray is supported by the ledges 78, its elevation is about the same as when the scale pin 56 slides off the support track 66 (FIG. 2). Thus, the upper tray position is for a forthcoming weighing operation, and the lower tray position is for a forthcoming dumping operation.

For actuating the memory arm clamps 70 (FIG. 3), each arm is provided with an upstanding cam roller 80 that engages a cam track 82 which is downstream of the track segment 60. According to the empty or full condition of the tray as it progresses beyond the cam tracks 82, the rollers 80 will either avoid or engage a second pair of cam tracks 84.

OPERATION

The operational sequence is described with reference to FIGS. 2 and 3, and for convenience in correlating the positions of the trays 12, they are sequentially labeled T1 to T8, inclusive, in their direction of movement. It should be noted that, depending upon the number of scale units 16 employed, tray T1 may be either the first tray of the upper flight of the conveying machine 10, or the trays T1—T8 may be any group of trays intermediate the ends of the overall conveying flight. In the present case, it will be assumed that the trays are an intermediate group. Accordingly, the trays have already passed over some scale units 16 which were preset to remove stalks S from the trays T6 and T8 which were heavier than the weight required to depress the scale beams 52 for the two scale units 16 which are illustrated.

The tray T1 approaching the first scale unit 16 is held in the channels 74 of the associated memory clamp arm 70, in a manner later described, and is about to progress beyond the terminal ramps 86 of an upstream pair of the cam tracks 84. The track rollers 58 are engaged with the track segments 60 and the leading side of the tray is overlying the mounting bar 24.

As the rollers 58 move along the track segments 60 toward the position shown for tray T2, the cam rollers 80 for the memory clamp arms 70 respectively engage the outer surfaces of approach ramps 88 for the cam tracks 82. Accordingly, the clamp arms 70 are pivoted away from the ends of the tray 12 whereby the tray, just downstream of the position of tray T2, is unsupported by the clamp arms at the time the scale pin 56 for the tray T2 contacts an upstream end portion 90 of the declining ramp 66. This portion is substantially level with the scale beam 52, as shown in FIG. 5, but drops away as shown in FIG. 1 so that the scale beam supports the tray as it advances beyond the position of tray T2.

The scale beam 52 will be depressed some amount proportionate to the weight of a stalk S. If the scale is set to weigh a stalk heavier than the stalk in a tray, the scale beam 52 will not depress sufficiently to allow the conical end of the scale pin 56 (FIG. 5) to move under the knife edge 62 (FIG. 1). In this case, the scale pin will ride atop the track 64 at about its former elevation. Then, the rollers 80 of the memory clamp arms 70 move down terminal ramps 92 of the cam tracks 82 and the channel portions 74 of the clamp arms reengage the tray to support the tray as shown in FIG. 5, and as shown for the tray T5 (FIG. 3). The tray T3 will be gripped in the described manner, and its cam rollers 80 will then be inward clear of the approach ramps 94 of the succeeding cam track 84. The tray T3 will travel onward until its scale pin depresses some downstream scale beam sufficiently to effect the next described ejection of a stalk.

It should be noted from the preceding description that the channel portions 74 of the memory clamp arms 70 grip each tray to support the tray as it travels from one scale unit which is preset to weigh a stalk S that is heavier than the stalk contained in the tray. This mode of operation is continued until a scale unit is reached which has been preset in a weight range which includes the weight of the stalk which has formerly been rejected by the other scale units.

Assuming that the stalks S in the tray T2 is heavy enough to depress the adjacent scale beam 52, the scale pin 56 (FIG. 1) will pass under the knife edge 62 and over the declining ramp 66. It will be apparent that the end portions of the tray T2 are thus at a lower elevation than in the formerly described instance of a tray having a stalk too light to cause its scale pin to ride under the knife edge 62.

In order to maintain temporary support of the tray T2 when its scale pin 56 clears the ramp 66 and the tray reaches the dumping position shown for the tray T4, the support ledges 78 of the memory clamp arms 70 will move inward to the position shown in FIG. 6. The actuation of the memory clamp arms 70 is the same as previously described; the cam rollers 80 move along the outer surfaces of the terminal ramps 92, and when clear of the ramps are swung inward by their biasing springs 73. Since the tray ends are now below the channel portions 74 of the memory clamp arms 70, the ledge portions 78 (FIG. 6) of the clamp arms are in supporting relation with the tray T2 when it moves over the adjacent discharge conveyor 18.

It is important to note that when a tray is supported on the ledges 78 of its memory arm clamps 70, that a vertical abutment at 98 (FIG. 6) prevents the memory arms from swinging inward as far as when the tray is gripped in the channel portions 74 of the memory arms. Due to this limited inward movement, the cam rollers 80 (FIG. 3) of the arms are now in a position to contact the outer surfaces of the approach ramps 94 of the cam tracks 84. Therefore, the memory arm clamps are swung simultaneously outward to remove support from the tray, as shown for the tray T4. The tray support member 36 is now free to move downward, substantially vertically because of its parallelogram linkage connection to the bracket 26, and the leading side of the tray strikes the mounting bar 24. As best shown in FIG. 2, the tray T4 tilts rearwardly about the pivot axis 50 so that the stalk S overbalances the tray and the stalk drops onto the discharge conveyor 18.

With continued reference to FIG. 2, the tray support member 36 for tray T4 remains in its lowered position until its cam rollers 58 ride up approach ramps 100 of the next downstream track segments 60. The empty tray T4 thus attains the position shown for the tray T6 and will not depress any downstream scale beams because of its empty condition, even though the next downstream cam tracks 82 release the memory arm clamps 70.

It will now be apparent that the upper conveying flight of the grading machine 10 comprises a repetitive pattern of one scale unit 16 between two cam tracks 82, and a discharge conveyor 18 between two cam tracks 84, and that the functions of the component parts of each pattern function in the same manner which has been described.

In summary of the features believed to be novel, an important aspect of the invention is the torsionally rigid tray support member 36 and its parallelogram linkage comprising the pairs of links 30 and 32, whereby the forces localized on the scale pin 56 are substantially vertical and are unaffected by the weight distribution of the article or articles in the tray 12. Another important feature that contributes to an efficient, compact and relatively inexpensive weight grading machine is the memory arm clamp and actuating cam structures which, according to the article weight, either precondition a tray for a dumping operation or for transport to the next downstream scale.

Although the best mode contemplated for carrying out the present invention has been herein shown and described, it will be apparent that modification and variation may be made without departing from what is regarded to be the subject matter of the invention.

I claim:

1. In a weight grading machine, a pair of driven endless chains including an elongate upper conveying flight, a plurality of longitudinally spaced tray support means interconnecting said chains along said flight, a transversely elongate tray assembly adjacent each of said support means, parallelogram linkage interconnecting each end portion of said tray assembly and said tray support means for confining movement of said tray to a substantially vertical plane, and a scale pin carried by said tray assembly adjacent one end thereof, said tray assembly being torsionally inflexible so that the weight localized on said scale pin is substantially the same regardless of the location of an article in said tray.

2. In a weight grading machine including a pair of laterally spaced driven endless chains having an elongate upper conveying flight, article supporting cuplike trays movable along said flight, and diverter scales spaced along said upper flight for successively weighing the articles and dumping the article if the weight of the article falls within the weight range setting of a scale, the tray assembly improvement comprising a transversely elongate mounting bar interconnecting the conveying chains, a transversely elongate tray in parallel relation to the mounting bar, a torsionally inflexible tray support member in supporting relation with said tray, parallelogram linkage pivotable upon horizontal axes interconnecting each end portion of said support member and said mounting bar for restricting all but vertical movement of the tray, and a scale pin carried by said tray support member, said scale pin being arranged to slide along the weighing platforms of said scales, the weight of the movable tray assembly and article localized at said scale pin being thus unaffected by the position, shape or weight distribution of the article in the tray.

3. Apparatus according to claim 2 wherein said torsionally inflexible tray support member includes an elongate bar underlying said tray and a depending leg secured to said parallelogram linkage at each end of said bar, and a laterally projecting scale pin mounted in one of said legs remote from the transverse center of the tray so that the tray assembly and article are capable of being weighted by a scale platform laterally offset from the central portion of said tray.

4. Apparatus according to claim 3 wherein said tray is torsionally rigid, and a continuous tray mounting hinge interconnecting said tray and said torsionally inflexible tray support member for dumping movement of said tray about an axis parallel to the longitudinal dimension of the tray.

5. Apparatus according to claim 4 wherein said tray mounting hinge is arranged for rearward dumping movement of the tray relative to its forward direction of travel along said upper flight.

6. Apparatus according to claim 5 wherein the axis of said tray mounting hinge is substantially coincident with the trailing transverse edge of said tray support member, and wherein the tray overhangs said mounting bar forwardly of said hinge, said tray support member in a dumping operation dropping below said mounting bar and said mounting bar engaging said overhanging tray portion to tilt and then overbalance the tray and article therein rearwardly about said axis and dump the article from the tray.

7. Apparatus according to claim 6 and a memory clamp arm pivotally mounted on each end portion of said mounting bar, means biasing each clamp arm toward the associated tray; each clamp arm including means defining an inwardly open channel portion arranged to straddle the end of said tray rearwardly of the pivot axis of said hinge, means defining a support ledge inward and below said channel; and first stationary camming means arranged to be contacted by the moving clamp arms, said clamp arms being cammed out of gripping engagement with a tray approaching a scale unit and released by said camming means when the tray has been weighed, and thus released arms either supporting the tray on said ledges if the weight of the article has depressed the beam of the scale to position the tray at the elevation of said ledges, or gripping the tray in said channel portions if the weight of the article depresses the scale beam a lesser amount.

8. Apparatus according to claim 7 and second stationary camming means positioned downstream of said first camming means, said second camming means being arranged to engage only those clamp arms which are supporting a tray on said support ledges, the thus engaged clamp arms being cammed out of engagement with the tray so that said tray and said tray support member drop, the tray portion overhanging said support bar thus causing the tray to tilt rearward about the axis of said hinge to dump the article therein.